(12) United States Patent
Barcock

(10) Patent No.: US 8,155,778 B1
(45) Date of Patent: Apr. 10, 2012

(54) SYSTEM AND METHOD FOR FABRICATING INSULATED DUCTWORK

(75) Inventor: Peter Barcock, Lancashire (GB)

(73) Assignee: AUTODESK, Inc., San Rafael, CA (US)

( * ) Notice: Subject to any disclaimer, the term of this patent is extended or adjusted under 35 U.S.C. 154(b) by 383 days.

(21) Appl. No.: 12/021,191

(22) Filed: Jan. 28, 2008

Related U.S. Application Data

(60) Provisional application No. 60/886,907, filed on Jan. 26, 2007.

(51) Int. Cl.
G06F 19/00 (2011.01)
B26D 5/20 (2006.01)
B23D 25/02 (2006.01)
B23D 36/00 (2006.01)

(52) U.S. Cl. ............. 700/172; 83/76.1; 83/284; 83/358

(58) Field of Classification Search .................. 700/172, 700/119; 83/76.1, 284, 358
See application file for complete search history.

(56) References Cited

U.S. PATENT DOCUMENTS

| 3,605,534 | A | * | 9/1971 | Barr | 409/304 |
|---|---|---|---|---|---|
| 4,951,539 | A | * | 8/1990 | Buckner | 83/884 |
| 5,918,644 | A | * | 7/1999 | Haack et al. | 138/151 |
| 6,222,155 | B1 | * | 4/2001 | Blackmon et al. | 219/121.39 |
| 6,276,355 | B1 | * | 8/2001 | Zhang et al. | 125/20 |
| 6,397,122 | B1 | * | 5/2002 | Lindstrom et al. | 700/145 |
| 6,470,377 | B1 | * | 10/2002 | Sevcik et al. | 709/201 |
| 6,813,985 | B2 | * | 11/2004 | Gharst et al. | 83/863 |
| 2005/0158107 | A1 | * | 7/2005 | Acher | 400/621 |
| 2005/0240300 | A1 | * | 10/2005 | Sigtryggsson et al. | 700/171 |

FOREIGN PATENT DOCUMENTS

EP 454855 A1 * 11/1991

OTHER PUBLICATIONS

NAIMA, "Fibrous Glass Residential Duct Construction Standard", 2002, NAIMA, Third Edition, p. 20.*
MultiCam, Product Information, Jan. 2006, MultiCam. http://web.archive.org/web/20060427014253js_/www.multicam.com.au/products.html.*

* cited by examiner

Primary Examiner — Albert Decady
Assistant Examiner — Darrin Dunn
(74) Attorney, Agent, or Firm — Patterson & Sheridan, LLP

(57) ABSTRACT

A system and method that may utilize one or more cutting tools to machine insulating sheet materials comprising one or more layers. In accordance with one aspect, a user may utilize a computer to input preferences and use software algorithms to determine an optimum fabrication sequence.

15 Claims, 6 Drawing Sheets

SYSTEM AND METHOD FOR FABRICATING INSULATED DUCTWORK

REFERENCE TO RELATED APPLICATIONS

This application claims the benefit of U.S. Provisional Application No. 60/866,907, filed Jan. 26, 2007. The contents of that provisional application are incorporated by reference herein.

BACKGROUND

1. Field of the Invention

Aspects of the present invention relate generally to manufacturing ductwork constructed from insulating panels, and more particularly to a system and method that may utilize one or more cutting tools to machine insulating sheet materials comprising one or more layers.

2. Description of Related Art

Numerically controlled or computer numerically controlled (CNC) machine tools typically utilize a computer "controller" to drive a machine tool that may be utilized to automatically produce large quantities of components in a reliable, precise and efficient manner. CNC machine tools may be utilized to machine, for example, ductwork used for transporting air and other fluids.

To machine ductwork components, for example a duct fitting, a CNC machine tool may be utilized to cut sheet metal is cut into insulation panels of various sizes and shapes, which may then be arranged and joined to form a duct fitting.

FIG. 1 illustrates various views an exemplary duct fitting. Insulation panels 100 of various shapes and sizes are illustrated in FIG. 1a. Insulation panels 100 may be assembled to for a L-shaped duct fitting as illustrated in FIG. 1b.

Traditional ductwork is manufactured from 18-26 gauge (~0.04" thick) metal (e.g., galvanized steel, aluminum). Cutting and shaping such thin metals typically does not require a complex CNC cutting tool, and typically may be accomplished with one cutting iteration.

However, with the advent of energy conservation policies, a demand for more energy-efficient ductwork is increasing. Such energy-efficient ductwork may require the use of more energy-efficient materials. For example, a multi-layered, multi-composition sheet material (or "substrate") of substantially enhanced thickness (0.75", 1.5", or greater) may be used to achieve greater insulation and energy savings. With the use of these substrates come a great number of considerations in the cutting, shaping and arranging processes that were not previously present when using relatively thinner metals.

SUMMARY

Embodiments of the present invention overcome the above-mentioned and various other shortcomings of conventional technology, providing a system and method that may utilize one or more cutting tools to machine insulating sheet materials comprising one or more layers. In accordance with one aspect, a user may utilize a computer to input preferences and use software algorithms to determine an optimum manufacturing sequence.

The foregoing and other aspects of various embodiments of the present invention will be apparent through examination of the following detailed description thereof in conjunction with the accompanying drawing figures.

BRIEF DESCRIPTION OF THE DRAWING FIGURES

FIG. 1 illustrates various views of a duct fitting.

FIGS. 2a-f illustrate various cuts that may be utilized in fabricating a substrate for assembly into ductwork.

FIGS. 3a-f illustrates various cuts that may be utilized in fabricating a substrate for assembly into ductwork.

DETAILED DESCRIPTION

Figure 1B:
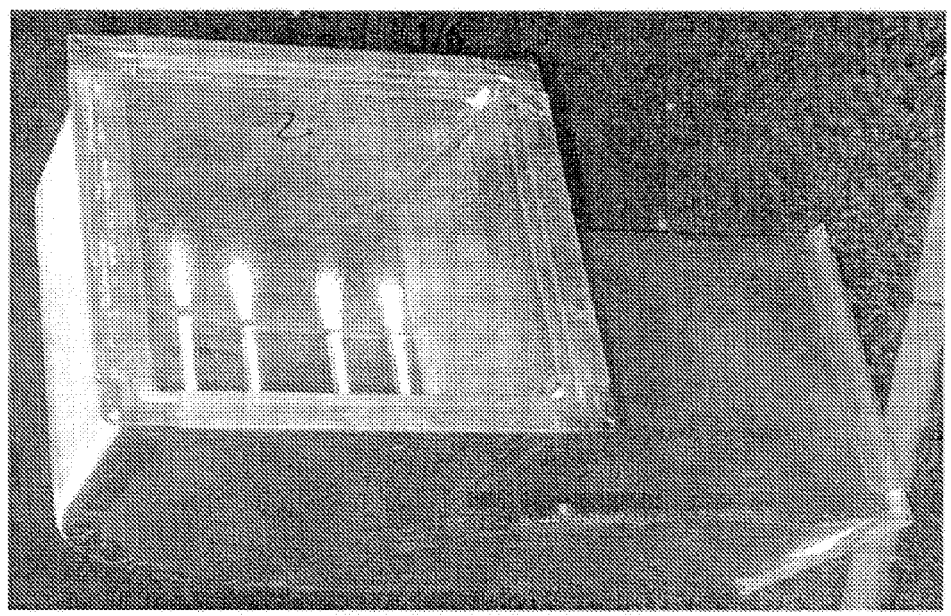
Figure 1A:
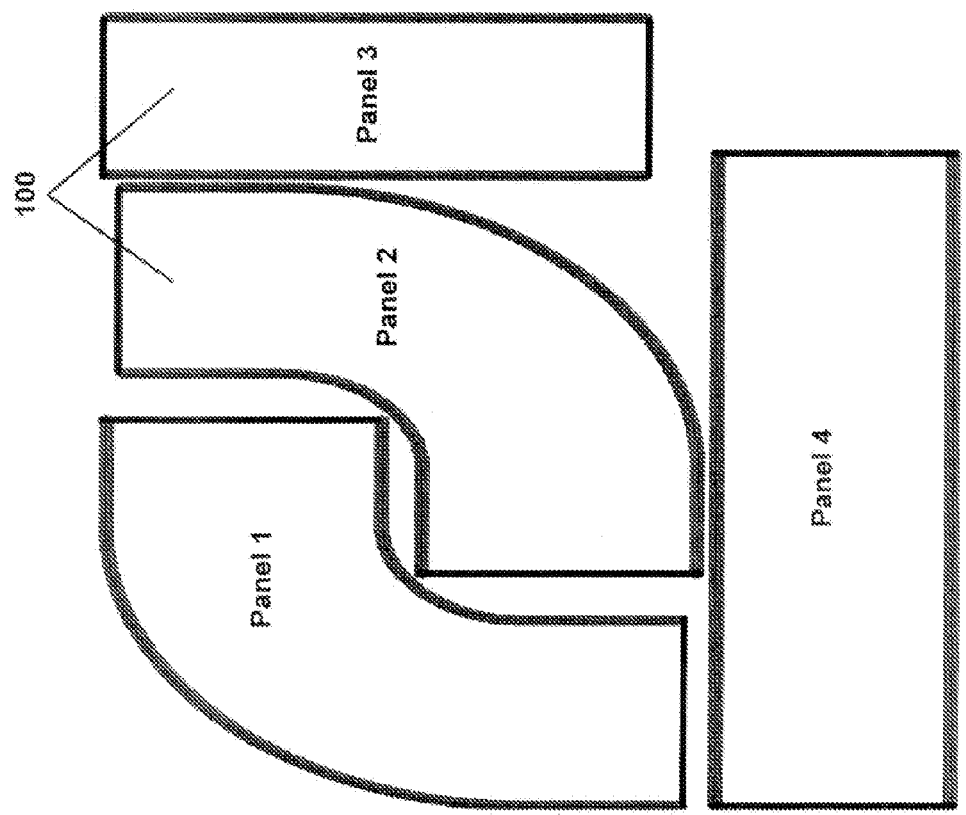

Detailed descriptions of one or more embodiments of the invention follow, examples of which may be graphically illustrated in the drawings. Each example and embodiment are provided by way of explanation of the invention, and not meant as a limitation of the invention. For example, features or described as part of one embodiment may be utilized with another embodiment to yield still a further embodiment. It is intended that the present invention include these and other modifications and variations.

As described above, a multi-layered, multi-composition sheet material of significant thickness may be used to achieve greater insulation and energy conservation. Examples of such a multi-layered, multi-composition sheet material ("substrate") may be a thicker resin-bonded glass fiber layer laminated with a thinner reinforced aluminum foil layer, or a thicker polystyrene layer with a thinner galvanized steel backing. The thickness of these multi-layered, multi-composition substrates may be 0.75" or greater.

Using CNC machining tools to fabricate these substrates may require a multitude of considerations in order to optimize the fabrication process.

For example, the shape, dimensions, and jointing characteristics of the fabricated insulated panels or the material composition of the substrate may be considered in determining the optimum fabrication sequence (hereinafter "substrate characteristics").

Other significant considerations may include consideration of the particulars to the fabrication process (hereinafter "process characteristics"). Examples of process characteristics may include, but are not limited to, tooling, beveling, nesting and kerfing.

Tooling typically may refer to the considerations involving the cutting tools; for example, tooling consideration may include customizing the number, type, iterations, and sequence of cutting tools in cutting a particular substrate. The cutting tools may include, but are not limited to, rotary blades, water jets, or lasers. Each cutting tool requires its own particular considerations such as, for example, in cutting margins (offsets).

Beveling may refer to the process of forming an edge that is not perpendicular (e.g., 45 degrees) to the faces of a piece (or sheet). Beveling may be achieved by different cutting tools including, but not limited to a cutting tool angled at 45 degrees or a cone-shaped cutter.

Nesting typically may refer to arranging a sequence of operations on each substrate sheet with respect to one or more cutting tools to save material and time. A nesting order may take into account, among other things, material (i.e., waste minimization), tooling, time, and cost considerations. In some cases, a computerized algorithm may be utilized to develop nesting arrangements, or nesting arrangements may be developed and input manually.

A particular form of nesting is edge nesting. Typically, in sheet metal cutting, the edge of a sheet is often not used because the edges may be uneven or damaged. However, this is not an optimum use of material and may lead to unnecessary waste. Therefore, in some cases, where the edges of the sheet allow, it may be desirable to utilize any tooling cutter to generate a beveled cut along that edge. This minimizes waste because a beveled cut is generated without sacrificing any more material (i.e., an offset) than necessary.

A computerized nesting algorithm may be utilized to determine whether edge nesting is possible for a substrate sheet, and generate an optimum sequence of operations on substrate sheets to accomplish edge nesting. Edge nesting algorithms may take into account, among other things, edge conditions, alignment, and orientation (e.g., parallel, orthogonal).

Kerfing typically may refer to the effect of the width of the cutting tool on the shape and integrity of the substrate sheet. Inaccurate consideration of the width of a cutting tool may lead to an offset from a desired cutting location. Also, the composition of the substrate sheet may involve kerfing as well; for example, different layers of a substrate sheet may react differently to the cutting tool and its cutting width. In some cases, a software algorithm may be utilized to calculate proper kerfing characteristics (e.g., offsets required to compensate for the cutting tool width).

Various considerations related to the cutting process may be taken into account as well. For example, common line cutting, where the substrate sheets are positioned to allow cuts along common lines of two panels, may be utilized to reduce the number of cutting iterations.

In the case of cutting sheet metal panel, the minimal thickness of the sheet often renders edge cutting a non-issue. However, in the case of the thicker or multi-layered substrates discussed above, the thickness of a substrate may have more implications.

One reason this may be so is because a tool for cutting a relatively thicker layer of a substrate may not be appropriate in cutting a relatively thinner layer. Utilizing the same tool to cut both layers may fray the edges of the thinner layer, thereby creating imprecision and waste. In these cases, it may be desirable to use one cutting tool to cut one layer or thickness of a substrate, and use another tool to cut another layer or thickness of the substrate.

Take, for example, the case of a thicker resin-bonded glass fiber layer laminated with a thinner reinforced aluminum foil layer. In certain cases, a bevel cutting tool that produces an angled cut of 45 degrees may be utilized to cut a beveled edge along the length of thicker resin-bonded glass fiber layer. However, when cutting the fiber layer, the thinner metal layer must be kept intact. Therefore, accurate height control of the first cutting tool is essential. After cutting the fiber layer with a first tool, a second, more precise tool may be used to cut the relatively thinner aluminum layer, thereby achieving full separation from the substrate sheet. This may be known as a "periphery cut".

FIG. 2 illustrates various cuts that may be utilized in fabricating a sheet substrates for assembly into a ductwork item. FIG. 2a illustrates a bevel cutter 200 (e.g., a cone-shaped cutter) may be used to cut away a portion of thicker layer 201, while keeping the thinner layer 202 intact. FIG. 2b illustrates the substrate layer after a first cutting tool has cut thicker layer and a second cutting tool has cut the thinner layer, thereby separating the two edges into a first portion 203 and second portion 204 of the substrate. FIG. 2c illustrates how the edges of first portion 203 and second portion 204 may be fitted together to form a ductwork edge portion (e.g., a corner).

Figure 2A:
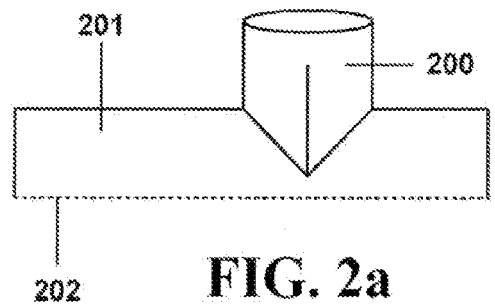
Figure 2B:
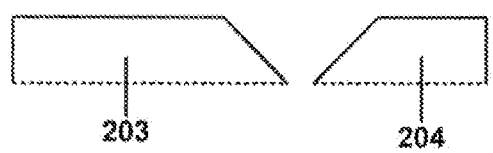
Figure 2C:
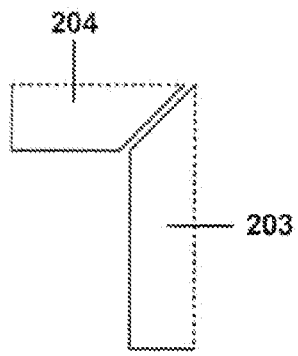
Figure 2F:
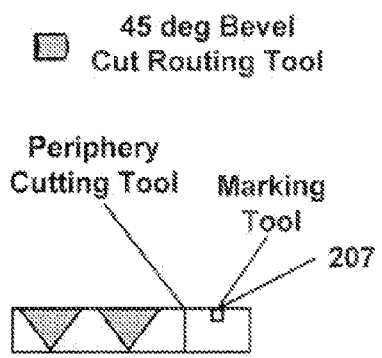
Figure 2D:
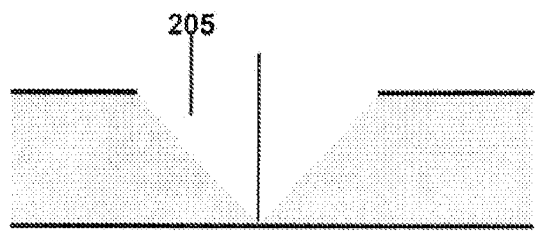
Figure 2E:
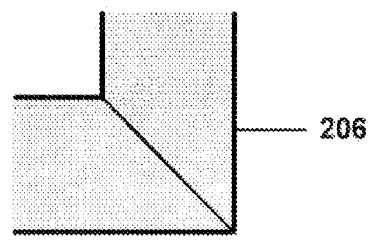

In other cases, as shown in FIG. 2d, an angled cutter (e.g., a 45-degree cone shaped cutter) may be utilized to form an approximately triangular cut 205 in the substrate. This cut portion substrate may then be folded together to collapse the triangular cut and form an ductwork edge portion (e.g., a corner). See FIG. 2e. It may be desirable to cut only inner portions (e.g., inner layers) of the substrate and leave the outer portions (e.g., an outer layer) intact; when folded, the intact outer portion may form a continuous barrier surface 206.

As shown in FIG. 2f, in some instances, a marking tool (and by extension, a marking tool path or sequence) may be utilized to indicate folding or joining positions along the panel. The marked indicia 207 may then be utilized to facilitate assembly.

FIG. 3 illustrates further various cuts that may be utilized in fabricating a substrate for assembly into ductwork. FIG. 3a illustrates, for example, a 90-degree cone-shaped cutter 301 that may be used to cut multi-layered substrate 302. Multi-layered substrate 302 may include, for example, inner layer 303, thicker middle layer 304 and thinner outer layer 305. In this example, the tool depth of cone-shaped cutter 301 is greater than the thickness of multi-layered substrate 302.

Figure 3A:
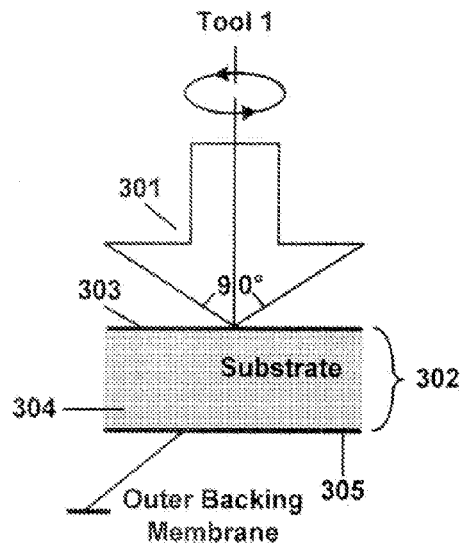
Figure 3B:
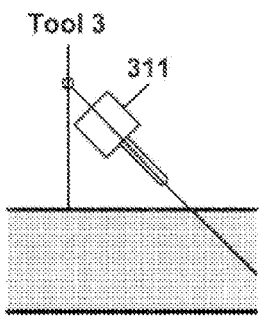

Alternatively, as shown in FIG. 3b, a narrow, angled tool 311 may be used to make a desired cut in the substrate as well.

Figure 3D:
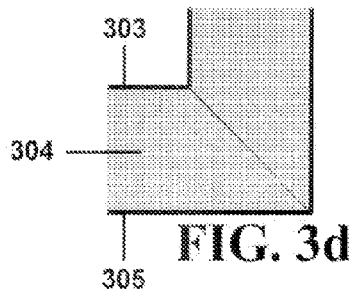
Figure 3C:
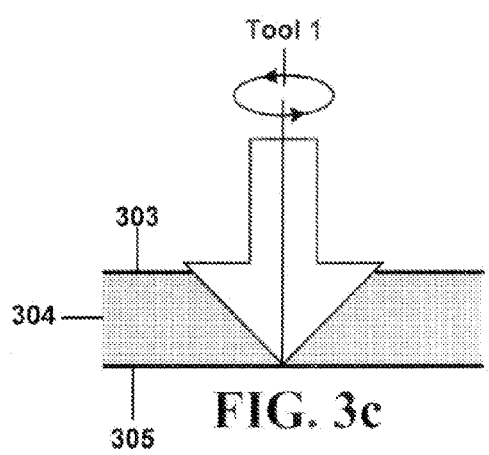
Figure 3E:
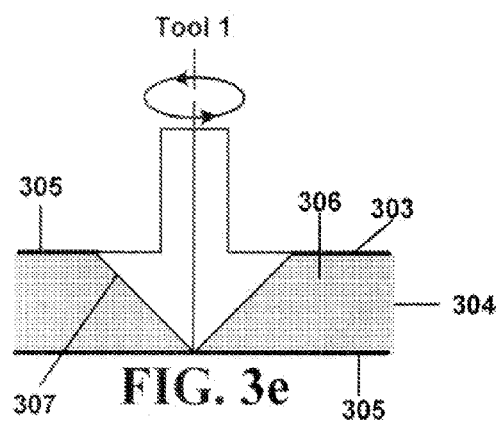

Continuing with the 90-degree cone-shaped cutter 301 shown in FIG. 3a, the cutter may be controlled to cut through inner layer 303 and thicker middle layer 304, but stop short of thinner outer layer 305. See FIG. 3c. This may allow the cut portion of multi-layered substrate 302 to be folded to form a 90-degree angle, while maintaining the integrity of thinner outer layer 305 (as shown in FIG. 3d).

In other cases, cone-shaped cutter 301 may be controlled to cut through the membrane (including inner layer 303, thicker middle layer 304 and thinner outer layer 305) to form a first portion 305 and a second portion 306 in the substrate. See FIG. 3e. In this example, both first portion 305 and second portion 306 may include an 45-degree angled edge 307. However, as described above, a cutter for thicker inner layer 303 may not be appropriate for cutting thinner outer layer 304 as it may fray the edges of the thinner layer, thereby creating imprecision and waste.

Therefore, it may be desirable to stop cone-shaped cutter 301 short (without cutting through the membrane), and continue cutting with a second pass with, for example, a second cutting tool 308 (e.g., a periphery cutting tool). See FIG. 3f. Cutting through with second cutting tool 308 may form first portion 309 and second portion 310.

Figure 3F:
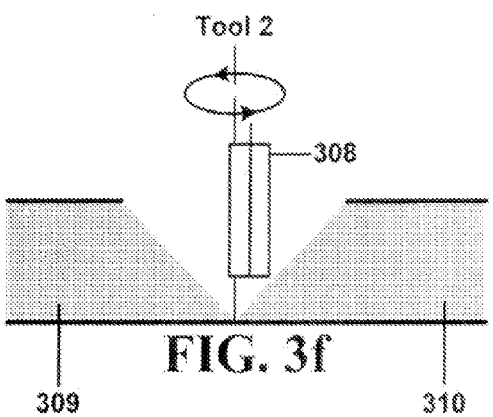

In some cases, second cutting tool may need to be offset from the center line of the cut resulting from the first cutting tool 301 (as shown in FIG. 3f).

As described above, a computer program may be utilized to determine the optimum sequence of the assembly operation according to the considerations described above (e.g., nesting, marking, and cutting). These considerations may be interrelated, in that the particulars of one consideration of the fabrication process may have an effect on another.

For example, a sequence of insulation panel fabrication that prioritizes cost may be completely different from a sequence that emphasizes speed (i.e., time). Moreover, as described above, it may be desirable or necessary to use one tool to cut to a certain depth or to cut a certain substrate, while using a second tool to cut another depth or a second substrate. In such cases, the tooling and nesting implications must be considered in order to achieve optimized fabrication and assembly. A computer program may present to a user an optimized sequence, which may be then altered by the user by resetting particular options (e.g., nesting options, tooling options).

Figure 4:
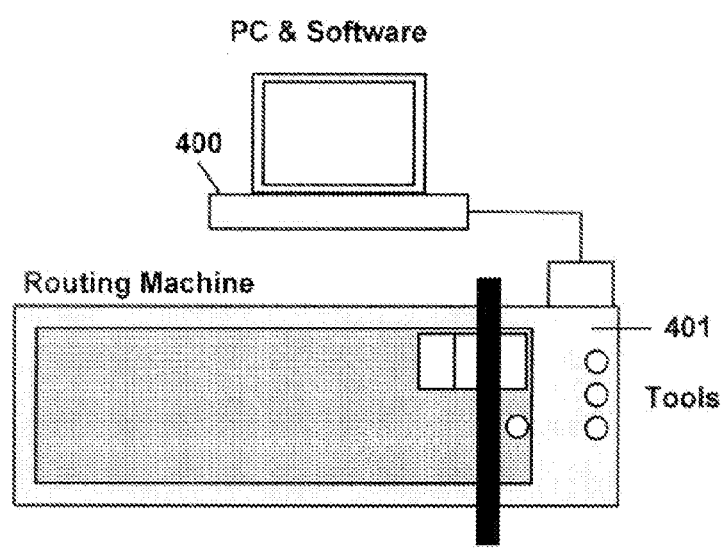
FIG. 4 is a simplified diagram of an exemplary substrate cutting system.

FIG. 4 is a simplified diagram of an exemplary substrate cutting system embodiment. In this embodiment, a computer 400 is connected to CNC routing machine 401. Computer 400 may be a networked computer, in that it may be connected to other computers. Computer 400 may also comprise a memory unit (not shown) to store, among other things, the software programs to carry out various ductwork manufacturing processes. The software may include various algorithms relating to the processes described above (e.g., tooling, kerfing, nesting), which may be utilized to determine an optimum manufacturing sequence.

The software may also include a software graphical user interface (GUI) to allow the user to pick and/or specify fittings characteristics (e.g., dimensions, offsets, beveling characteristics) and further define or alter particulars of the manufacturing process (e.g., nesting characteristics, tooling sequences) by selecting various options.

The software available on computer may include, for example, a library of insulation duct fittings, including specifications any other information relevant to the manufacturing process.

The software may also include a numerical control data program to convert manufacturing sequence instructions as determined by the software into machine dependent codes that may then be sent to the various machines required in the ductwork manufacturing process.

The computer may be connected to or comprise an input device that may be utilized to import ductwork design specifics directly from a computer-aided design (CAD) drawing (e.g., a scanner) or may be configured to automatically import design specifics from an electronic design file.

As used herein, computer 400 may comprise, for example, but is not limited to, a personal computer, a mainframe computer, a data processing unit, a data storage unit or the like. A server may comprise one or more computers, and may be connected to, for example the Internet, via broadband connection in any of various ways generally known in the art (e.g., cable, DSL, fiber, satellite, etc.), or via other communications technology and protocols developed and operative in accordance with known principles.

In certain embodiments, CNC routing machine 401 may comprise multiple cutting tool stations that may each accommodate a different cutting tool. In other embodiments, CNC routing machine 401 may comprise a cutting tool changer that enables different cutting tools to be switched out according to need. In certain embodiments, the software of computer 400 may suggest a cutting tool (based on any of the considerations discussed above).

In this embodiment, CNC routing machine 401 receives instructions from the software of computer 100 and converts said instruction to machine dependent codes that may be utilized to carry out the aforementioned ductwork processes.

Figure 5:
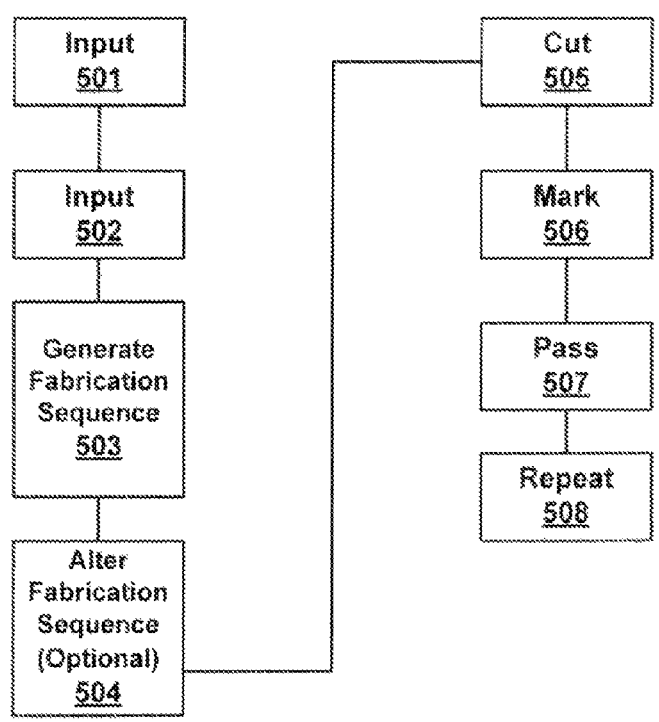
FIG. 5 is a simplified block diagram illustrating operation of one embodiment of a method of utilizing one or more cutting tools to machine insulating sheet materials comprising one or more layers.

FIG. 5 is a simplified block diagram illustrating operation of one embodiment of a method of utilizing one or more cutting tools to machine insulating sheet materials comprising one or more layers ("substrate"). In this embodiment, the substrate is a 2" thick resin-bonded glass fiber layer laminated with a thinner reinforced aluminum foil layer (0.05" thick).

As indicated in block 501, a user may utilize a computer (e.g., FIG. 4, 400) to input desired substrate characteristics (as described above).

As indicated in block 502, a user may utilize the computer to input desired process characteristics.

As indicated in block 503, a user may utilize software algorithms loaded in on the computer to generate a fabrication sequence (as described above). The software algorithm may also determine the necessary spatial specifics in the precision cutting including the placement, offsets etc.

As indicated in block 504, a user may reset particular options and alter the fabrication sequence, if necessary.

As indicated in block 505, a first cutting tool of a CNC routing machine (e.g., FIG. 4, 401) may make a pass to make, for example, a bevel cut (for the reasons described above) in the resin-bonded glass fiber layer of the substrate. The fabrication sequence developed in blocks 502, 503, and 504 would ensure that the cut from the first cutting tool would not penetrate the aluminum foil back layer.

As indicated in block 506, a second cutting tool of the CNC routing machine may make a pass to create small surface cuts ("marking") to indicate folding or joining positions along the panel.

As indicated in block 507, a third cutting tool of the CNC routing machine (or, in other embodiments, the second cutting tool described above) may make a pass to traverse around the periphery of each panel to separate the panels from the remaining portion of the substrate.

As indicated in block 508, steps 501-506 may be repeated to fabricate multiple panels required to assemble, for example, a duct fitting.

The sequence and numbering of blocks depicted in FIG. 5 is not intended to imply an order of operation to the exclusion of other possibilities. Those of skill in the art will appreciate that the foregoing systems and methods are susceptible to various modifications and alterations. For example, the marking described block 506 may not always be necessary.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of fabricating insulated ductwork comprising:
generating, using a computer comprising at least one software algorithm and responsive to user input, a set of desired substrate characteristics for said insulated ductwork, including selecting a multi-layered insulation substrate;
generating, using the computer and responsive to user input, a set of desired process characteristics, including a ductwork fabrication sequence;
transmitting the set of desired process characteristics, including the ductwork fabrication sequence, from the computer to a computer numerical controlled machine;
controlling a first angled cone-shaped cutting tool using the computer numerical controlled machine to cut the multi-layered insulation substrate to a first depth responsive to the ductwork fabrication sequence;
controlling a second periphery cutting tool using the computer numerical controlled machine to cut the multi-layered insulation substrate to a second depth to form a first portion and a second portion having angled edges, also responsive to the ductwork fabrication sequence; and
joining the angled edge of the first portion and the angled edge of the second portion to form a ductwork edge portion;
wherein the multi-layered insulation substrate comprises a glass fiber layer and an aluminum foil layer, and the aluminum foil layer remains uncut and forms a continuous barrier surface when folded.

2. The method of claim 1, wherein the ductwork fabrication sequence provides instructions concerning functions selected from the group consisting of tooling, beveling, nesting, edge nesting, kerfing, or marking.

3. The method of claim 1, wherein the first portion remains attached to the second portion prior to the joining.

4. The method of claim 1, wherein the first portion is separated from the second portion prior to the joining.

5. The method of claim 1, wherein at least one layer of the multi-layered insulation substrate remains uncut and the at least one layer forms a continuous barrier surface when folded.

6. The method of claim 1, wherein the set of desired process characteristics comprises shape, dimensions, and jointing characteristics of fabricated insulated panels to determine an optimum fabrication sequence.

7. The method of claim 1, wherein the set of desired process characteristics comprises material composition of the multi-layered substrate to determine an optimum fabrication sequence.

8. A system for fabricating insulated ductwork comprising:
- a computer, comprising at least one software algorithm and responsive to user input, to generate a set of desired substrate characteristics for said insulated ductwork, including selecting a multi-layered insulation substrate, and to generate a set of desired process characteristics, including a ductwork fabrication sequence;
- a computer numerical controlled machine to receive the set of desired process characteristics, including the ductwork fabrication sequence, from the computer;
- a first angled cone-shaped cutting tool controlled by the computer numerical controlled machine to cut a multi-layered insulation substrate to a first depth responsive to the ductwork fabrication sequence;
- a second periphery cutting tool controlled by the computer numerical controlled machine to cut the multi-layered insulation substrate to a second depth to form a first portion and a second portion having angled edges, also responsive to the ductwork fabrication sequence; and
- a ductwork edge portion formed by joining the angled edge of the first portion and the angled edge of the second portion;
- wherein the multi-layered insulation substrate comprises a glass fiber layer and an aluminum foil layer, and the aluminum foil layer remains uncut and forms a continuous barrier surface when folded.

9. The system of claim 8, wherein the ductwork fabrication sequence provides instructions concerning functions selected from the group consisting of tooling, beveling, nesting, edge nesting, kerfing, or marking.

10. The system of claim 8, wherein the first portion remains attached to the second portion prior to the joining.

11. The system of claim 8, wherein the first portion is separated from the second portion prior to the joining.

12. The system of claim 8, wherein the computer further comprises an input device to receive an electronic file from which the computer generates the ductwork fabrication sequence.

13. The system of claim 8, wherein at least one layer of the multi-layered insulation substrate remains uncut and the at least one layer forms a continuous barrier surface when folded.

14. The system of claim 8, wherein the set of desired process characteristics comprises shape, dimensions, and jointing characteristics of fabricated insulated panels to determine an optimum fabrication sequence.

15. The system of claim 8, wherein the set of desired process characteristics comprises material composition of the multi-layered substrate to determine an optimum fabrication sequence.

* * * * *